United States Patent
Tsinker

(10) Patent No.: US 9,885,577 B2
(45) Date of Patent: Feb. 6, 2018

(54) REDUCING RESONANCE PEAKS AND DRIVE TONES FROM A MICRO-ELECTRO-MECHANICAL SYSTEM GYROSCOPE RESPONSE

(71) Applicant: INVENSENSE, INC., San Jose, CA (US)

(72) Inventor: Vadim Tsinker, Belmont, CA (US)

(73) Assignee: INVENSENSE, INC., San Jose, CA (US)

(*) Notice: Subject to any disclaimer, the term of this patent is extended or adjusted under 35 U.S.C. 154(b) by 215 days.

(21) Appl. No.: 14/814,016

(22) Filed: Jul. 30, 2015

(65) Prior Publication Data

US 2017/0030714 A1 Feb. 2, 2017

(51) Int. Cl.
  G01C 19/56 (2012.01)
  G01C 19/5776 (2012.01)
  G01C 19/5719 (2012.01)

(52) U.S. Cl.
  CPC ..... G01C 19/5776 (2013.01); G01C 19/5719 (2013.01)

(58) Field of Classification Search
  CPC ............ G01C 19/5776; G01C 19/5719; G01C 19/5705; G01C 19/5712; G01C 19/5747; G01C 19/5649
  See application file for complete search history.

(56) References Cited

U.S. PATENT DOCUMENTS

| 4,914,598 A * | 4/1990 | Krogmann | G01C 21/16 244/177 |
|---|---|---|---|
| 5,444,639 A * | 8/1995 | White | G01C 19/5607 708/300 |
| 5,600,063 A * | 2/1997 | Ogawa | G01C 19/5649 73/504.03 |
| 5,983,718 A * | 11/1999 | Wyse | G01C 19/5776 702/147 |
| 6,360,601 B1 * | 3/2002 | Challoner | G01C 19/5719 73/504.12 |
| 6,725,169 B2 * | 4/2004 | Thielman | H03L 7/08 702/104 |
| 7,284,408 B2 * | 10/2007 | Kato | G01P 21/00 73/1.37 |
| 9,329,042 B1 * | 5/2016 | Cazzaniga | G01C 19/5776 |
| 2005/0216149 A1 * | 9/2005 | Kato | G01P 21/00 73/1.37 |

(Continued)

Primary Examiner — Helen Kwok
(74) Attorney, Agent, or Firm — Amin, Turocy & Watson, LLP

(57) ABSTRACT

Reducing noise from drive tone and sense resonance peaks of a micro-electro-mechanical system (MEMS) gyroscope output using a notch filter is presented herein. The MEMS gyroscope can include a drive oscillation component configured to vibrate a sensor mass at a drive resonance frequency; a sense circuit configured to detect a deflection of the sensor mass, and generate, based on the deflection and the drive resonance frequency, a demodulated output; and a signal processing component configured to receive a set of frequencies comprising a first value representing the drive resonance frequency and a second value corresponding to a sense resonance frequency associated with the sense circuit, and apply, based on the first value and the second value, a notch filter to the demodulated output to obtain a filtered output.

22 Claims, 11 Drawing Sheets

(56) References Cited

U.S. PATENT DOCUMENTS

| | | | |
|---|---|---|---|
| 2006/0016259 A1* | 1/2006 | Smith | G01C 19/5614 73/504.02 |
| 2008/0098814 A1* | 5/2008 | Platt | G01C 19/5719 73/504.02 |
| 2008/0202237 A1* | 8/2008 | Hammerschmidt | G01C 19/5719 73/504.04 |
| 2011/0192226 A1* | 8/2011 | Hayner | G01C 19/5776 73/504.12 |
| 2014/0250970 A1* | 9/2014 | Fang | G01C 25/005 73/1.37 |
| 2015/0160011 A1* | 6/2015 | Nakajima | G01C 19/5776 702/56 |
| 2015/0377624 A1* | 12/2015 | Falorni | G01C 19/5712 73/504.12 |
| 2016/0010994 A1* | 1/2016 | Ackerman | G01C 19/5776 73/504.12 |

* cited by examiner

REDUCING RESONANCE PEAKS AND DRIVE TONES FROM A MICRO-ELECTRO-MECHANICAL SYSTEM GYROSCOPE RESPONSE

TECHNICAL FIELD

The subject disclosure generally relates to embodiments for reducing resonance peaks and drive tones from a micro-electro-mechanical system (MEMS) gyroscope response.

BACKGROUND

Processing of a Coriolis based output response of a MEMS gyroscope produces drive tone and resonance peaks at a difference between drive and sense resonant frequencies of the MEMS gyroscope. Although conventional MEMS gyroscope technologies utilize a low pass filter to reduce noise from drive tone and sense resonance peaks, such technologies increase filter settling time and system latency—negatively impacting system stability. In this regard, conventional MEMS gyroscope technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
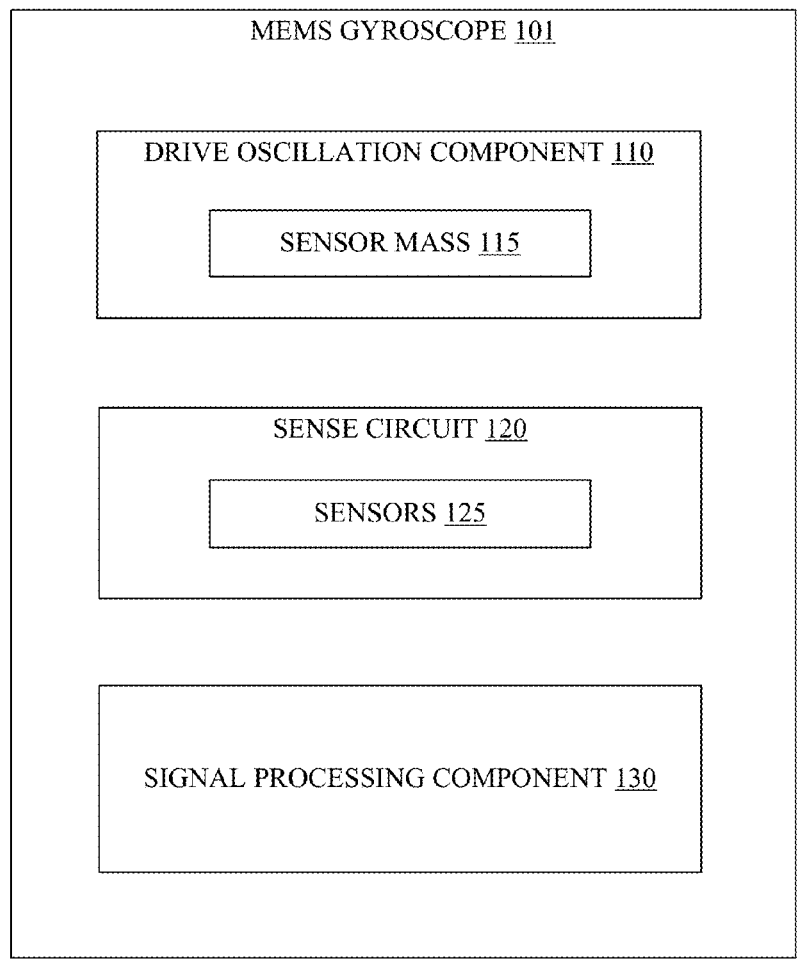
FIG. 1 illustrates a block diagram of a MEMS gyroscope including a signal processing component, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional MEMS gyroscope technologies have had some drawbacks with respect to use of a low pass filter to reduce noise from drive tone and sense resonance peaks. Various embodiments disclosed herein can improve system stability by utilizing a programmable notch filter to "notch out" frequencies corresponding to such peaks.

For example, a MEMS gyroscope can comprise a drive oscillation component that can be configured to vibrate a sensor mass at a drive resonance frequency, e.g., corresponding to a resonant frequency of the sensor mass. In an embodiment, the drive oscillation component can be configured to generate mechanical resonance of the sensor mass at the drive resonance frequency.

The MEMS gyroscope can further comprise a sense circuit that can be configured to detect a deflection, displacement, etc. of the sensor mass, e.g., corresponding to a coriolis force applied to the MEMS gyroscope, and generate, based on the deflection and the drive resonance frequency, a demodulated output. In one embodiment, the sense circuit can be configured to determine a change in capacitance of sensors capacitively coupled to the sensor mass.

In another embodiment, the sense circuit can be configured to generate, based on the change in the capacitance of the sensors, a deflection output, and amplify the deflection output using a charge-to-voltage amplifier to obtain an amplified output corresponding to the coriolis force, e.g., modulated by the drive resonance frequency. The sense circuit can be configured to demodulate, based on the drive resonance frequency, the amplified output to obtain a demodulated output—the demodulated output comprising resonant peaks at a difference between the drive resonance frequency and a sense resonance frequency corresponding to the sensors, and at integer multiples, or tones, of the drive resonance frequency.

In this regard, the MEMS gyroscope can further comprise a signal processing component that can be configured to receive a set of frequencies comprising a first value representing the drive resonance frequency and a second value corresponding to the sense resonance frequency. Further, the signal processing component can be configured to apply, based on the first value and the second value, a notch filter to the demodulated output to obtain a filtered output.

In one embodiment, the sense circuit can be configured to convert the demodulated output to a digital value utilizing an analog-to-digital converter. In this regard, the signal processing component can be configured to apply the notch filter to the digital value, e.g., utilizing a digital filter, to obtain the filtered output.

In another embodiment, the signal processing component can be configured to apply a low pass filter to the filtered output, e.g., the low pass filter having a cut-off frequency that is higher than cut-off frequencies of low pass filters of conventional MEMS gyroscope technologies.

In an embodiment, a method can comprise vibrating, by a drive oscillation component of a MEMS gyroscope, a sensor mass of the MEMS gyroscope at a drive resonance frequency, e.g., corresponding to a resonant frequency of the sensor mass. In one embodiment, the vibrating of the sensor mass can comprise generating, by the drive oscillation component, mechanical resonance of the sensor mass at the drive resonance frequency.

Further, the method can comprise detecting, by a sense circuit of the MEMS gyroscope, a deflection, displacement, etc. of the sensor mass, e.g., corresponding to a coriolis force applied to the MEMS gyroscope, and generating, by the sense circuit based on the deflection and the drive resonance frequency, a demodulated output. In an embodiment, the detecting of the deflection, displacement, etc. can comprise determining a change in capacitance of sensors capacitively coupled to the sensor mass.

In another embodiment, the generating of the demodulated output can comprise amplifying a deflection output representing the change in capacitance using a charge-to-voltage amplifier to obtain an amplified output, and demodulating, based on the drive resonance frequency, the amplified output to obtain the demodulated output. In yet another embodiment, the generating of the demodulated output can comprise converting the demodulated output to a digital value utilizing an analog-to-digital converter.

Further, the method can include receiving, by a signal processing component of the MEMS gyroscope, a set of frequencies from a memory—the set of frequencies comprising a first value representing the drive resonance frequency and a second value corresponding to a sense resonance frequency associated with the sense circuit. Furthermore, the method can include applying, by the signal processing component based on the first value and the second value, a notch filter to the demodulated output to obtain a filtered output. In an embodiment, the applying of the notch filter can comprise applying the notch filter to the digital value to obtain the filtered output. In one embodiment, the method can comprise applying, by the signal processing component, a low pass filter to the filtered output.

In another embodiment, a system can comprise a frequency identification component that can be configured to determine a drive resonance frequency corresponding to a vibration of a sensor mass of a MEMS gyroscope, and determine a sense resonance frequency of a sense circuit of the MEMS gyroscope. Further, the system can comprise a programming component that can be configured to store the drive resonance frequency and a value corresponding to the sense resonance frequency in a memory to facilitate an application, by the MEMS gyroscope, of a notch filter to a demodulated output using the drive resonance frequency and the value corresponding to the sense resonance frequency—the demodulated output corresponding to a coriolis force associated with a deflection of the sensor mass. In an embodiment, the value corresponding to the sense resonance frequency represents the sense resonance frequency and/or a difference between the sense resonance frequency and the drive resonance frequency.

In yet another embodiment, the frequency identification component can be configured to determine drive resonance frequencies corresponding to sensor masses of respective axes, e.g., x, y, and z, of the MEMS gyroscope, and determine sense resonance frequencies associated with sensors of the sensor masses. In this regard, the programming component can be configured to store the drive resonance frequencies corresponding to the sensor masses of the respective axes of the MEMS gyroscope, and values corresponding to the sense resonance frequencies associated with the sensors of the sensor masses, in the memory to facilitate a use, by the MEMS gyroscope, of notch filters according to the drive resonance frequencies and the values corresponding to the sense resonance frequencies.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of apparatus, devices, systems, processes, and process blocks explained herein can constitute machine-executable instructions embodied within a machine, e.g., embodied in a memory device, computer readable medium (or media) associated with the machine. Such instructions, when executed by the machine, can cause the machine to perform the operations described. Additionally, aspects of the apparatus, devices, systems, processes, and process blocks can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Conventional MEMS gyroscope technologies have had some drawbacks with respect to use of a low pass filter to reduce noise from drive tone and sense resonance peaks. On the other hand, various embodiments disclosed herein can improve system stability by utilizing a programmable notch filter to "notch out" frequencies corresponding to such peaks.

Figure 2:
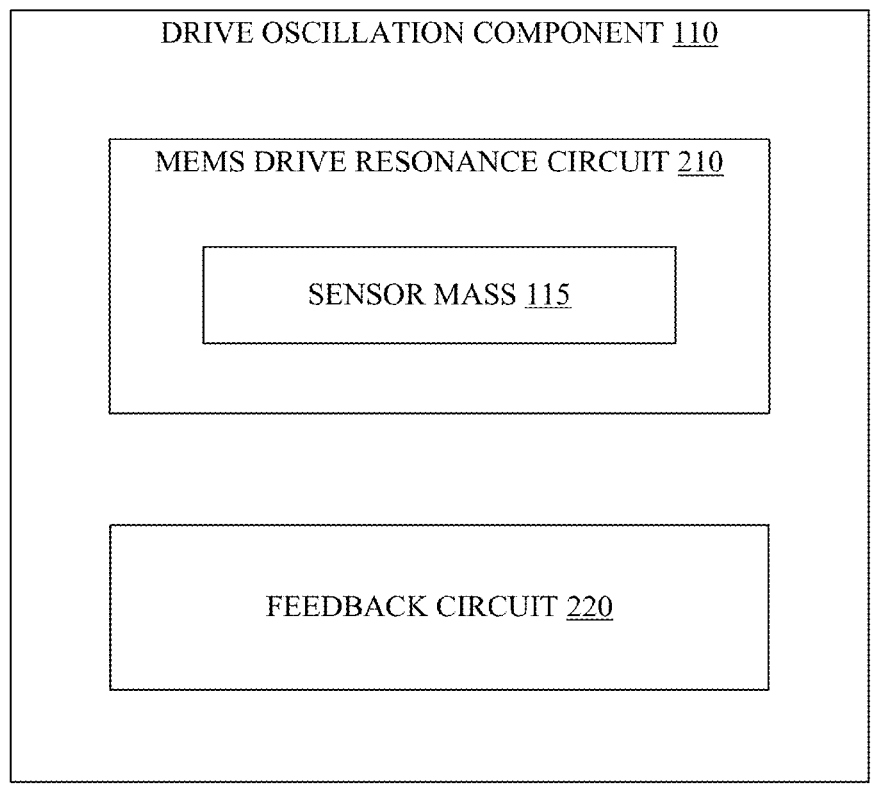
FIG. 2 illustrates a block diagram of a drive oscillation component of a MEMS gyroscope, in accordance with various embodiments.
Figure 3:
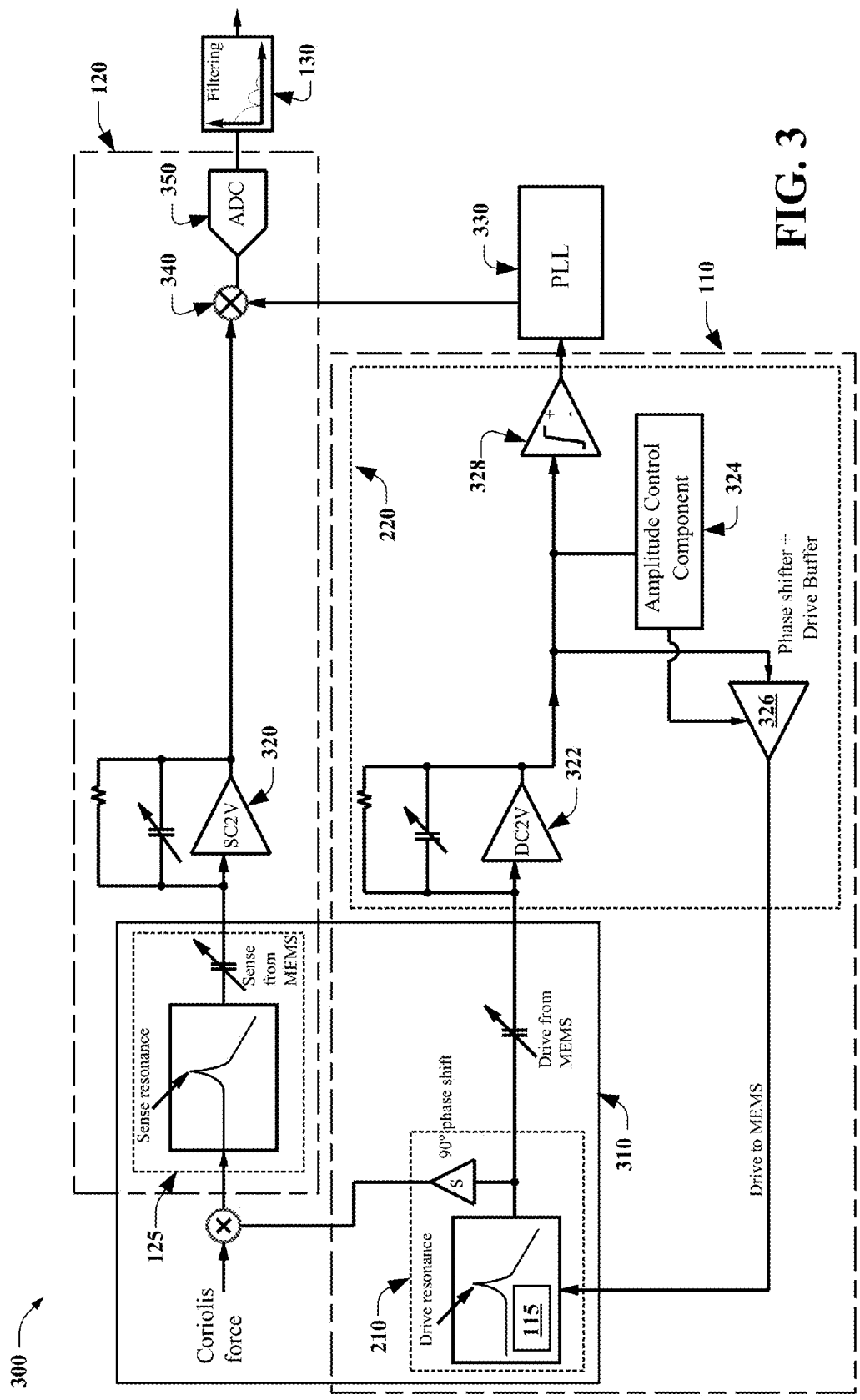
FIG. 3 illustrates another block diagram of a MEMS gyroscope, in accordance with various embodiments.

In this regard, and now referring to FIG. 1, MEMS gyroscope 101 includes drive oscillation component 110, sense circuit 120, and signal processing component 130. Drive oscillation component 110 can vibrate sensor mass 115 at a drive resonance frequency, e.g., corresponding to a resonant frequency of sensor mass 115. As illustrated by FIGS. 2 and 3, drive oscillation component 110 includes MEMS drive resonance circuit 210 and feedback circuit

220. Feedback circuit 220 includes charge-to-voltage voltage amplifier 322 that generates a clock signal based on a change in capacitance corresponding to a movement, or oscillation, of sensor mass 115, e.g., of MEMS die 310. In this regard, amplitude control component 324 can modify the gain of phase shifter-drive buffer 326 to maintain, via MEMS drive resonance circuit 210 of MEMS die 310, a mechanical resonance of sensor mass 115, at the drive resonance frequency and a substantially constant amplitude.

Figure 4:
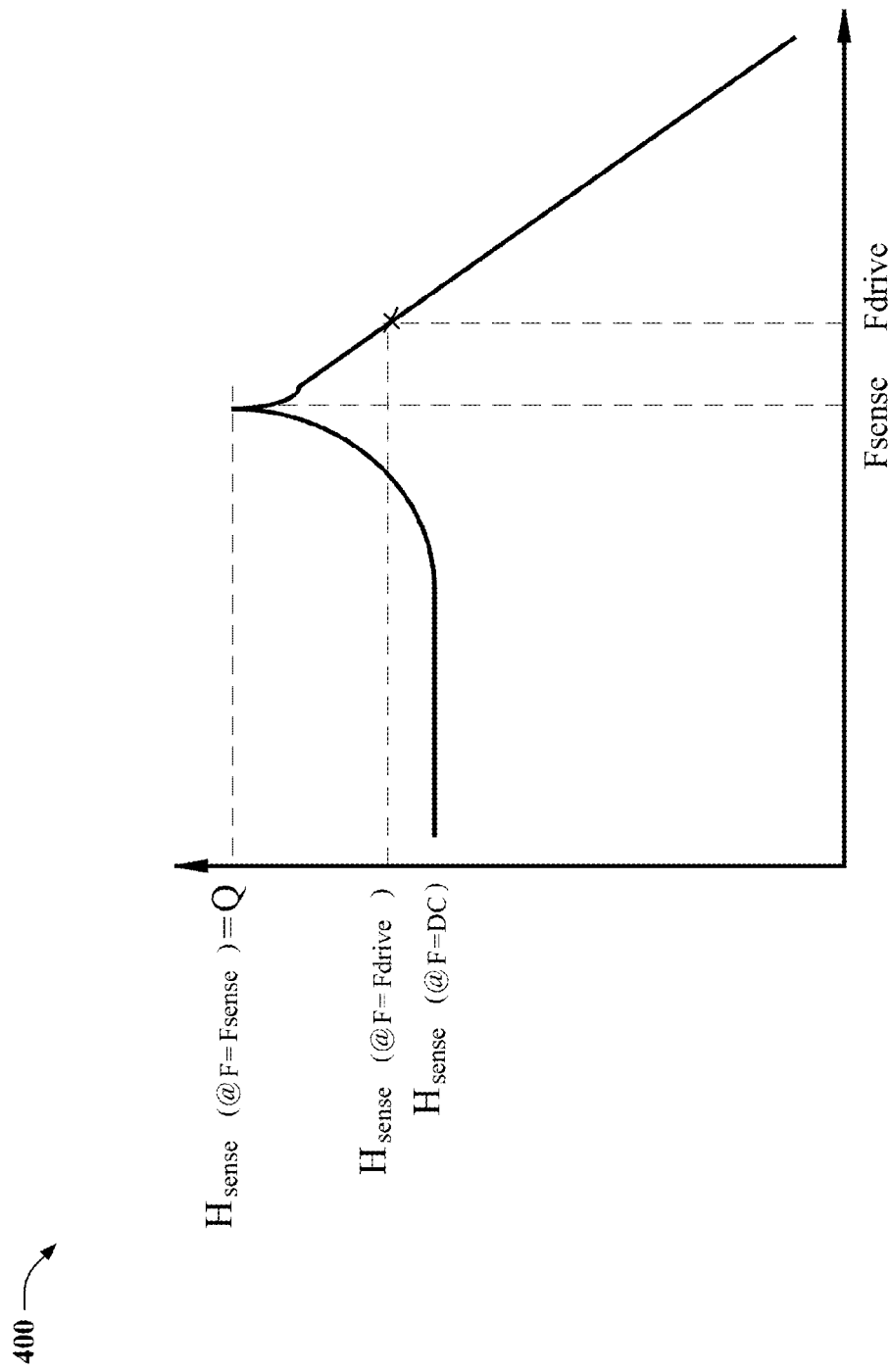
FIG. 4 illustrates a waveform of a MEMS sense resonance frequency response.

Sense circuit 120 can detect a deflection, displacement, etc. of sensor mass 115, e.g., corresponding to a coriolis force applied to MEMS gyroscope 101. In one embodiment, sense circuit 120 can detect the deflection, displacement, etc. of sensor mass 115 by determining a change in capacitance of sensors 125 capacitively coupled to sensor mass 115. As illustrated by FIG. 3, MEMS die 310 can generate, based on the change in capacitance of sensors 125, a deflection output. Further, charge-to-voltage amplifier 320 can amplify the deflection output to obtain an amplified output corresponding to the coriolis force, e.g., modulated by the drive resonance frequency. As illustrated by FIG. 4, waveform 400 of a sense resonance frequency response of MEMS gyroscope 101 comprises an amplitude response peak at $F_{sense}$, or the sense resonance frequency. Further, waveform 400 comprises a different amplitude response magnitude at $F_{drive}$, or the drive resonance frequency.

Based on the deflection and the drive resonance frequency, sense circuit 120 can generate a demodulated output. In this regard, phase-locked-loop (PLL) 330 can receive, from a comparator with hysteresis, e.g., Schmitt trigger 328, a clock signal that oscillates at the drive resonance frequency. Demodulator 340 can receive a clock signal from PLL 330 corresponding to the drive resonance frequency and demodulate, based on the clock signal, the amplified output corresponding to the coriolis force to obtain a demodulated output.

Figure 5:
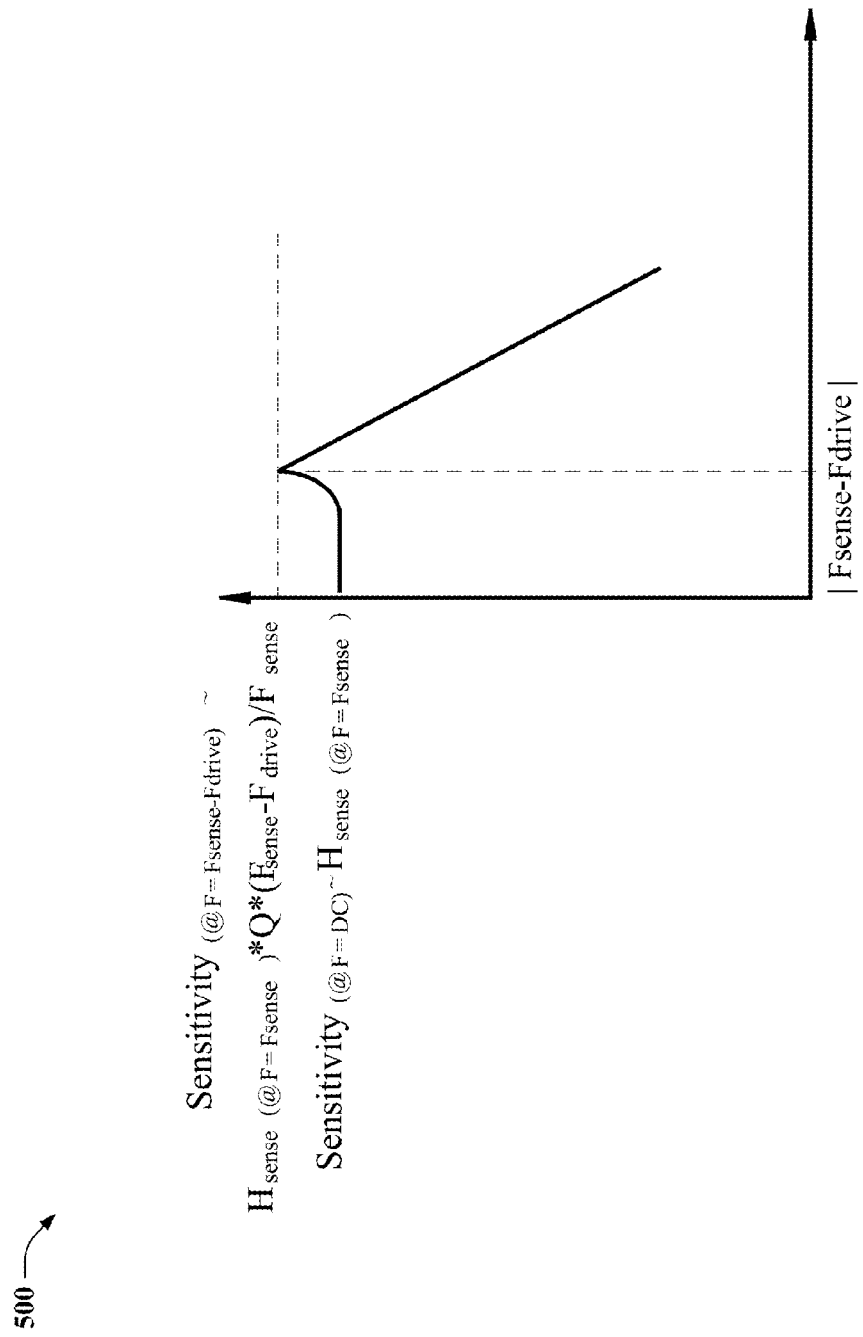
FIG. 5 illustrates a waveform of a transfer function corresponding to a frequency response of a MEMS gyroscope, in accordance with various embodiments.
Figure 6:
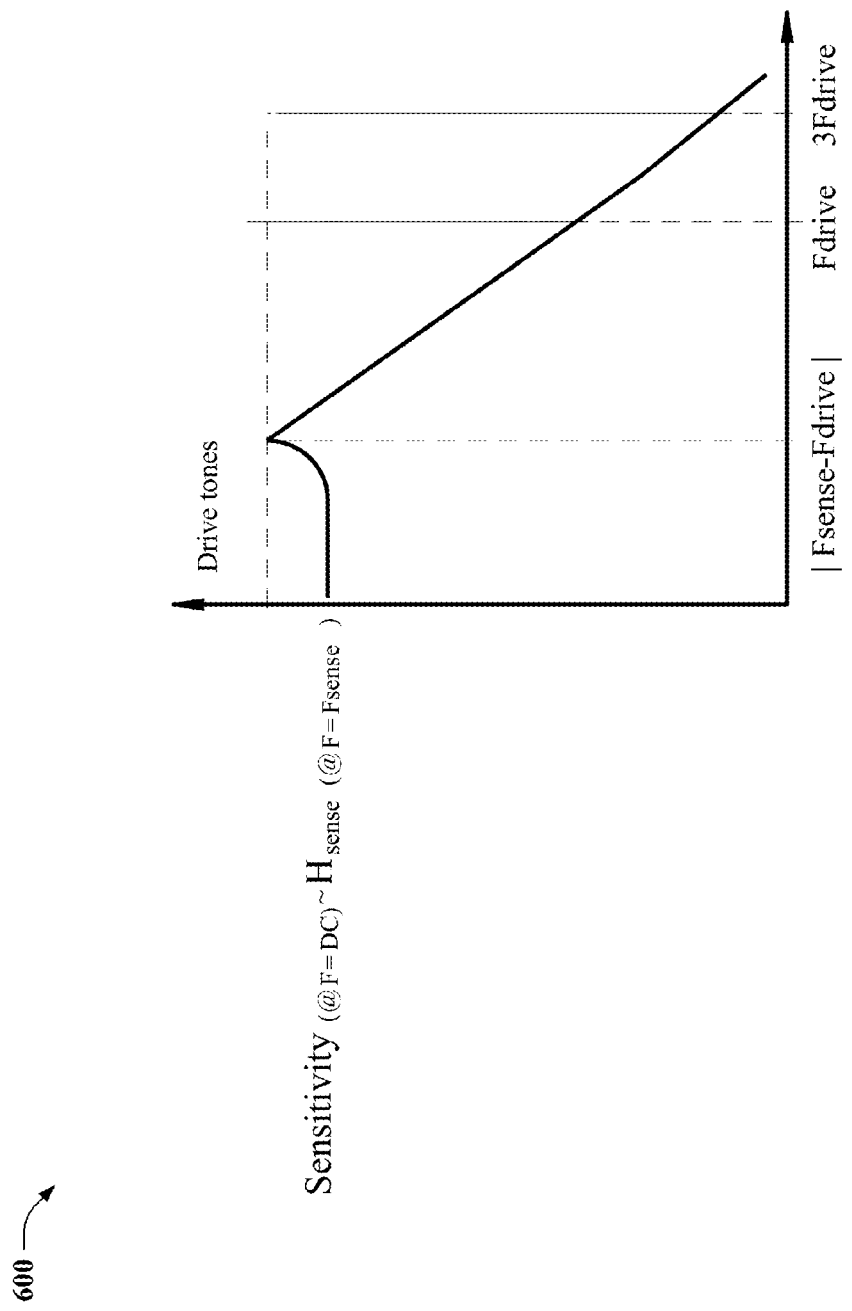
FIG. 6 illustrates another waveform of a transfer function corresponding to a frequency response of a MEMS gyroscope, in accordance with various embodiments.

FIG. 5 illustrates waveform 500 of a transfer function corresponding to the demodulated output. Waveform 500 comprises a peak at $|F_{sense}-F_{drive}|$, with the peak magnitude diminished by ratio $|F_{sense}-F_{drive}|/F_{sense}$. The peak amplifies MEMS Brownian noise and contributes significantly to total system noise, unless filtered. As illustrated by FIG. 6, waveform 600 of the transfer function further includes tones at integer multiples of $F_{drive}$, or the drive resonance frequency. Such tones can also contribute to total system noise.

In this regard, signal processing component 130 can receive, e.g., from a processing device coupled to MEMS gyroscope 101, e.g., from system 810 (see below), a set of frequencies comprising a first value representing the drive resonance frequency and a second value corresponding to the sense resonance frequency, e.g., the second value representing a difference between the drive resonance frequency and the sense resonance frequency. Further, signal processing component 130 can apply, based on the first value and the second value, a notch filter to the demodulated output to obtain a filtered output. In an embodiment, the second value corresponding to the sense resonance frequency represents the sense resonance frequency. In another embodiment, the second value represents a difference between the sense resonance frequency and the drive resonance frequency.

Figure 7:
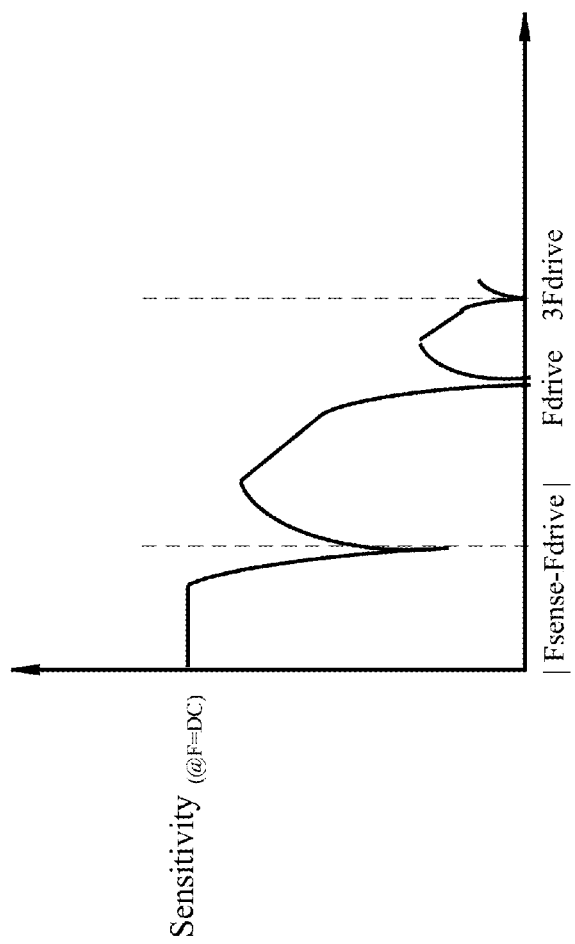
FIG. 7 illustrates a waveform of a frequency responses of a MEMS gyroscope, in accordance with various embodiments.

In one embodiment, sense circuit 120 can convert the demodulated output to a digital value utilizing analog-to-digital converter 350. In this regard, signal processing component 130 can apply the notch filter to the digital value, e.g., utilizing a digital filter, to obtain the filtered output. As illustrated by FIG. 7, signal processing component 130 can place notches, or "zeros", at $|F_{sense}-F_{drive}|$ and frequency locations associated with tones, or integer multiples, of $F_{drive}$, utilizing the digital filter, e.g., a programmable filter, etc. In this regard, use of the notch filter to reduce sense resonance peak and drive tone noise can significantly lower system latency, and improve performance in certain closed loop applications, e.g., associated with optical image stabilization.

In another embodiment, signal processing component 130 can apply a low pass filter (not shown) to the filtered output, e.g., the low pass filter having a cut-off frequency that is higher than cut-off frequencies of low pass filters of conventional MEMS gyroscope technologies.

It should be appreciated that portions of drive oscillation component 110 and sense circuit 120 that are not included in MEMS die 310 can be included in a separate die, chip, ASIC, etc. In this regard, PLL 330 and signal processing component 130 can be included in the separate die, chip, ASIC, etc.

Figure 8:
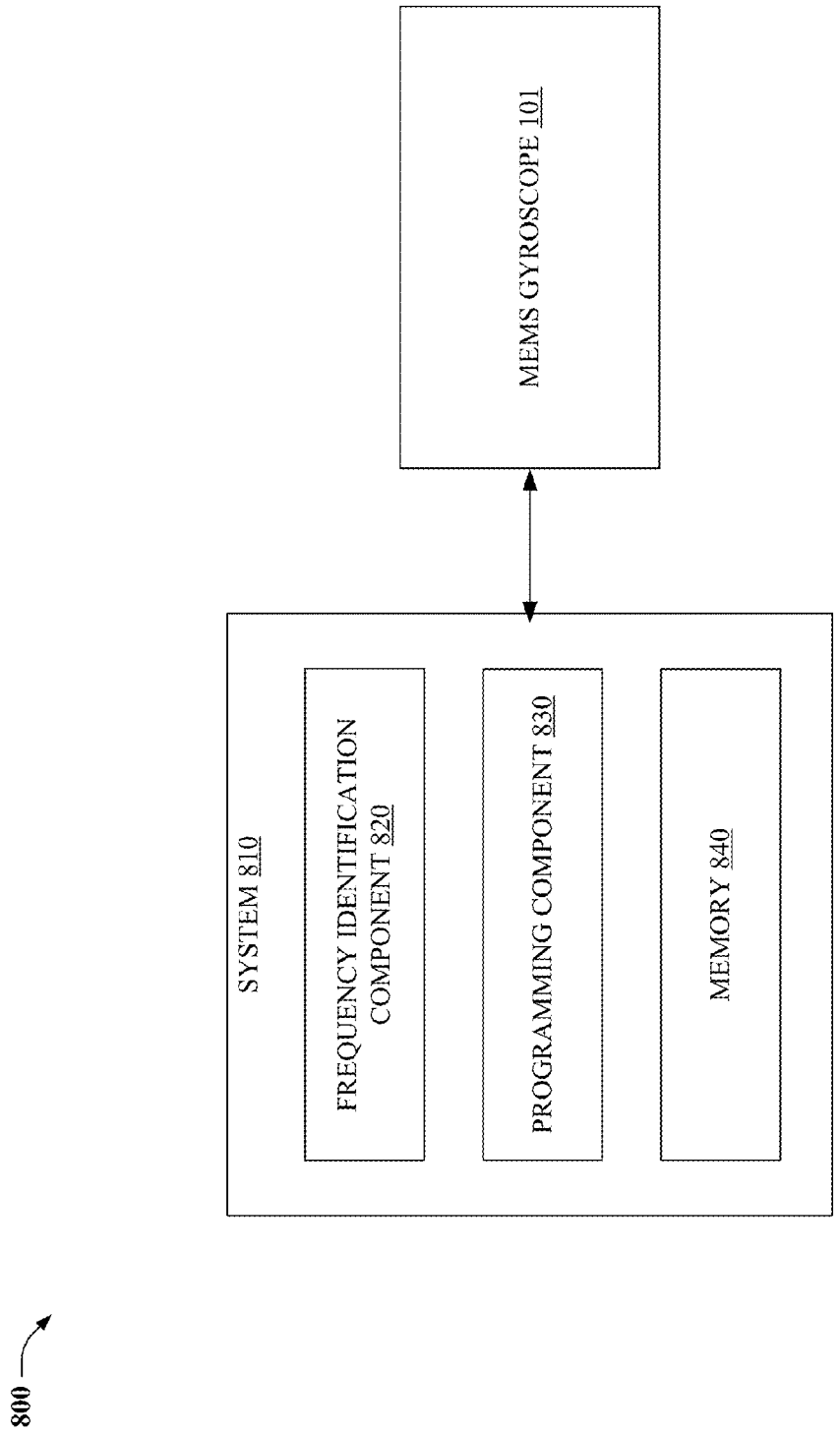
FIG. 8 illustrates a block diagram of a MEMS gyroscope configuration system, in accordance with various embodiments.

FIG. 8 illustrates a block diagram (800) of a MEMS gyroscope configuration system (810), in accordance with various embodiments. MEMS gyroscope configuration system 810 includes frequency identification component 820, programming component 830, and memory 840. Frequency identification component 820 can determine a drive resonance frequency corresponding to a vibration of sensor mass 115 of MEMS gyroscope 101. Further, frequency identification component 820 can determine a sense resonance frequency of sensors 125 of MEMS gyroscope 101.

Programming component 830 can store the drive resonance frequency and a value corresponding to the sense resonance frequency in memory 840 to facilitate an application, by MEMS gyroscope 101 using the drive resonance frequency and the value corresponding to the sense resonance frequency, of a notch filter to a demodulated output corresponding to a coriolis force associated with a deflection of sensor mass 115 of MEMS gyroscope 101. In an embodiment, the value corresponding to the sense resonance frequency represents the sense resonance frequency and/or a difference between the sense resonance frequency and the drive resonance frequency. It should be appreciated that in other embodiments (not shown), memory 840 can be separate from system 810, included in MEMS gyroscope 101, etc.

In another embodiment, frequency identification component 820 can determine drive resonance frequencies corresponding to sensor masses (e.g., 115) of respective axes, e.g., x, y, and z, of MEMS gyroscope 101, and determine sense resonance frequencies associated with sensors (e.g., 125) of the sensor masses. In this regard, an analog multiplexer (not shown) can be included in drive oscillation component 110 of MEMS gyroscope 101 to provide output signals of the respective axes to charge-to-voltage amplifier 322, and/or provide feedback signals from phase shifter-drive buffer 326 to the sensor masses of the respective axes. Further, other analog multiplexers (not shown) can be included in sense circuit 120 of MEMS gyroscope 101 to provide output signals from the sensors of the sensor masses of the respective axes to charge-to-voltage amplifier 320.

Programming component 830 can be configured to store the drive resonance frequencies corresponding to the sensor masses of the respective axes of the MEMS gyroscope, and values corresponding to the sense resonance frequencies associated with the sensors of the sensor masses, in memory 840 to facilitate a use, by MEMS gyroscope 101, of notch filter(s) according to the drive resonance frequencies and the values corresponding to the sense resonance frequencies.

Figure 9:
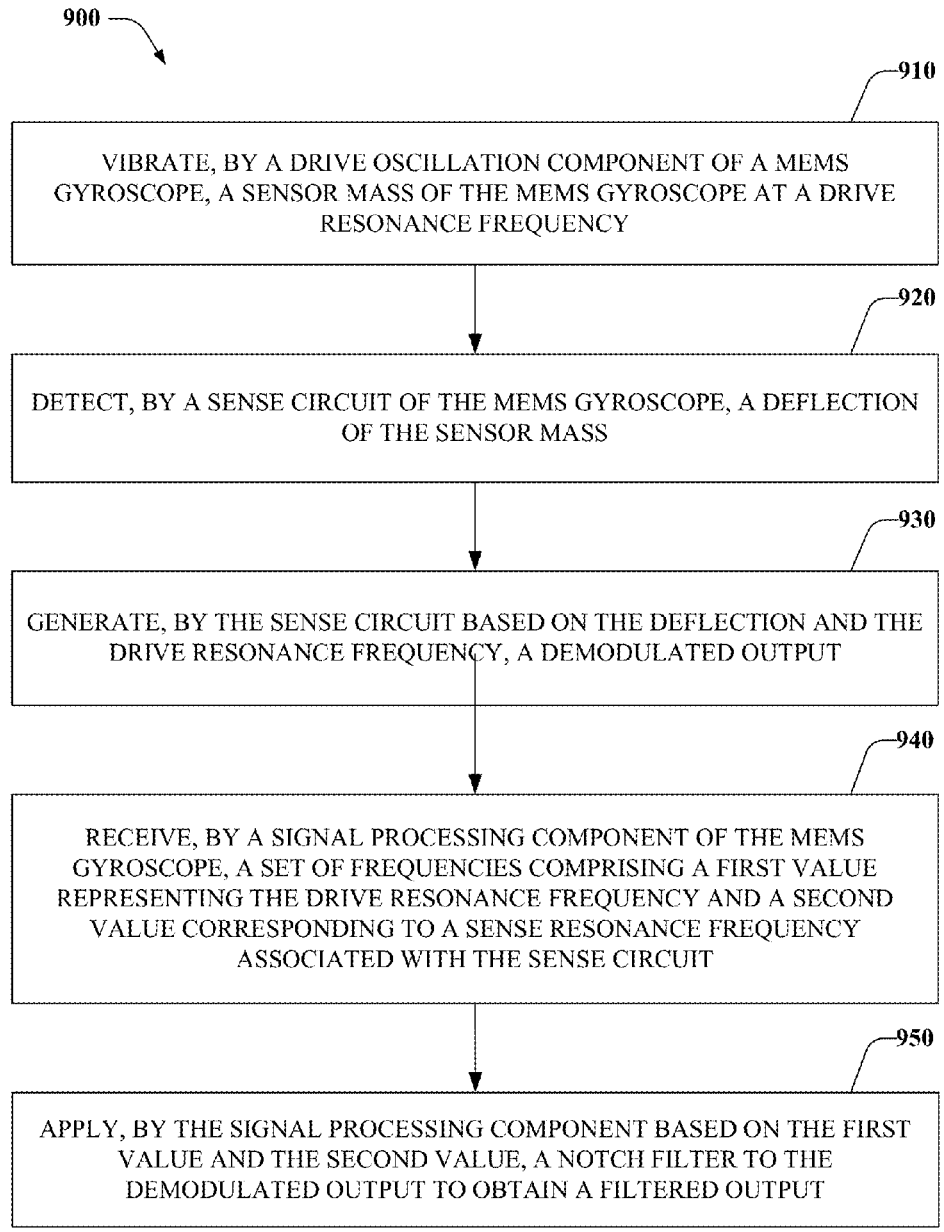
FIG. 9 illustrates a flowchart of a method associated with a MEMS gyroscope, in accordance with various embodiments.
Figure 10:
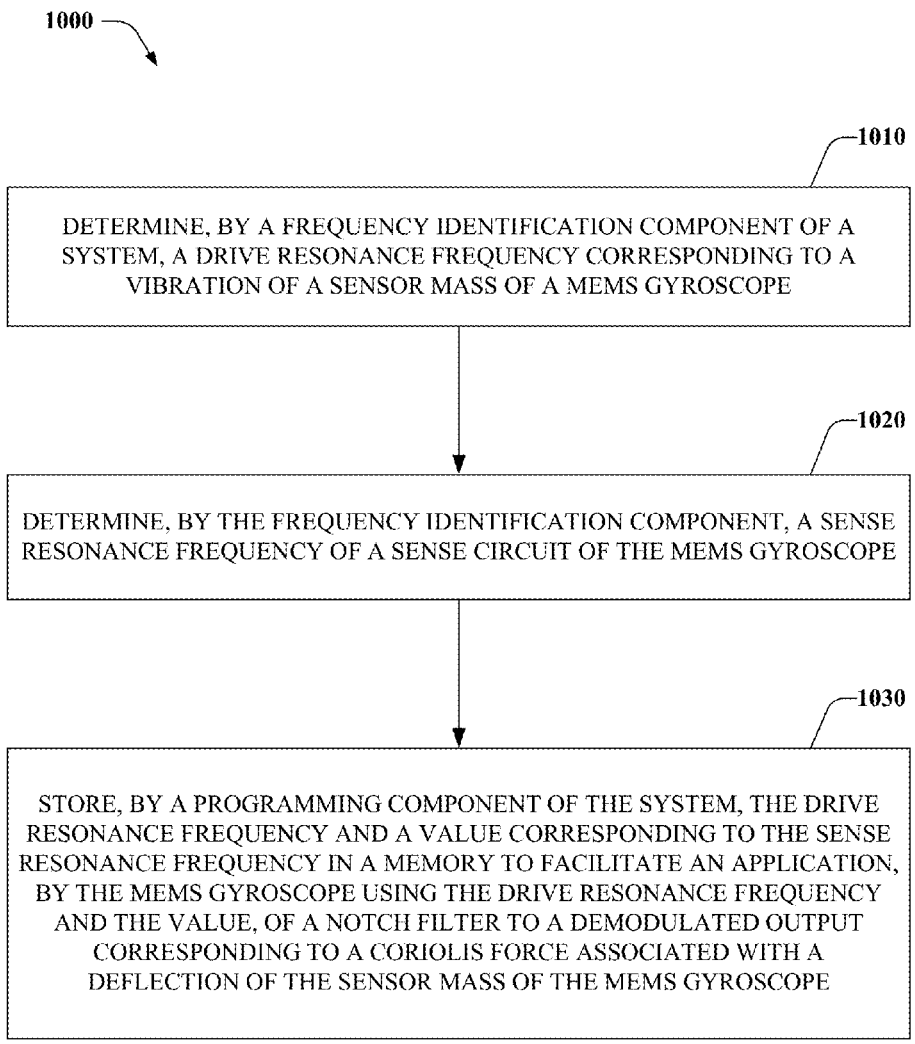
FIG. 10 illustrates a flow chart a method associated with a system for configuration of a MEMS gyroscope, in accordance with various embodiments.

FIGS. 9-10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that methodologies disclosed hereinafter and throughout this specification are capable of being stored on an article of manufacture to facilitate transporting and transferring such methodologies to computers, processors, processing components, etc. The term article of manufacture, as used herein, is intended to encompass a computer program accessible from any computer-readable device, carrier, or media.

Referring now to FIG. 9, process 900 performed by a MEMS gyroscope (e.g. 101) is illustrated, in accordance with various embodiments. At 910, a sensor mass of the MEMS gyroscope can be vibrated by a drive oscillation component of the MEMS gyroscope at a drive resonance frequency, e.g., corresponding to a resonant frequency of the sensor mass. At 920, a deflection, displacement, etc. of the sensor mass, e.g., corresponding to a coriolis force that has been applied to the MEMS gyroscope, can be detected by a sense circuit of the MEMS gyroscope, e.g., based on a determined change in capacitance of sensors capacitively coupled to the sensor mass.

At 930, a demodulated output can be generated by the sense circuit based on the deflection and the drive resonance frequency. In one embodiment (not shown), a deflection output representing the change in capacitance of the sensors can be amplified by the sense circuit, e.g., using a charge-to-voltage amplifier, to obtain an amplified output, and the amplified output can be demodulated by the sense circuit, based on the drive resonance frequency, to obtain the demodulated output. In another embodiment, (not shown), the demodulated output can be converted by the sense circuit to a digital value using an analog-to-digital converter.

At 940, a set of frequencies comprising a first value representing the drive resonance frequency and a second value corresponding to a sense resonance frequency associated with the sense circuit can be received, e.g., from system 810, by a signal processing component of the MEMS gyroscope. In an embodiment, the second value can represent a difference between the drive resonance frequency and the sense resonance frequency. At 950, a notch filter can be applied, by the signal processing component based on the first value and the second value, to the demodulated output, the digital value, etc. to obtain a filtered output.

FIG. 10 illustrates a process (1000) performed by a system (e.g. 810), in accordance with various embodiments. At 1010, a drive resonance frequency corresponding to a vibration of a sensor mass of a MEMS gyroscope, e.g., MEMS gyroscope 101, can be determined by a frequency identification component of the system. At 1020, a sense resonance frequency of a sense circuit of the MEMS gyroscope can be determined by the frequency identification component. At 1030, the drive resonance frequency and a value corresponding to the sense resonance frequency can be stored, by a programming component of the system, in a memory to facilitate an application, by the MEMS gyroscope using the drive resonance frequency and the value, of a notch filter to a demodulated output corresponding to a coriolis force associated with a deflection of the sensor mass of the MEMS gyroscope. In an embodiment, the value corresponding to the sense resonance frequency represents the sense resonance frequency and/or a difference between the sense resonance frequency and the drive resonance frequency.

In another embodiment (not shown), drive resonance frequencies corresponding to sensor masses of axes of the MEMS gyroscope, and sense resonance frequencies of sensors corresponding to the sensor masses can be determined by the frequency identification component. Further, the drive resonance frequencies and values corresponding to the sense resonance frequencies can be stored, by the programming component, in the memory to facilitate use, by the MEMS gyroscope, of notch filters according to the drive resonance frequencies and the values corresponding to the sense resonance frequencies.

As it employed in the subject specification, the terms "processor", "processing component", etc. can refer to substantially any computing processing unit or device, e.g., MEMS gyroscope 101, system 810, etc. comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, terms such as "memory" and substantially any other information storage component, e.g., memory 840, relevant to operation and functionality of systems and/or devices disclosed herein, e.g., MEMS gyroscope 101, system 810, etc. refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM. In other embodiment(s) nonvolatile memory can include read only memory (ROM), programmable ROM (PROM), electrically programmable ROM (EPROM), electrically erasable ROM (EEPROM), or flash memory. Additionally, the MEMS microphones and/or devices disclosed herein can comprise, without being limited to comprising, these and any other suitable types of memory.

Figure 11:
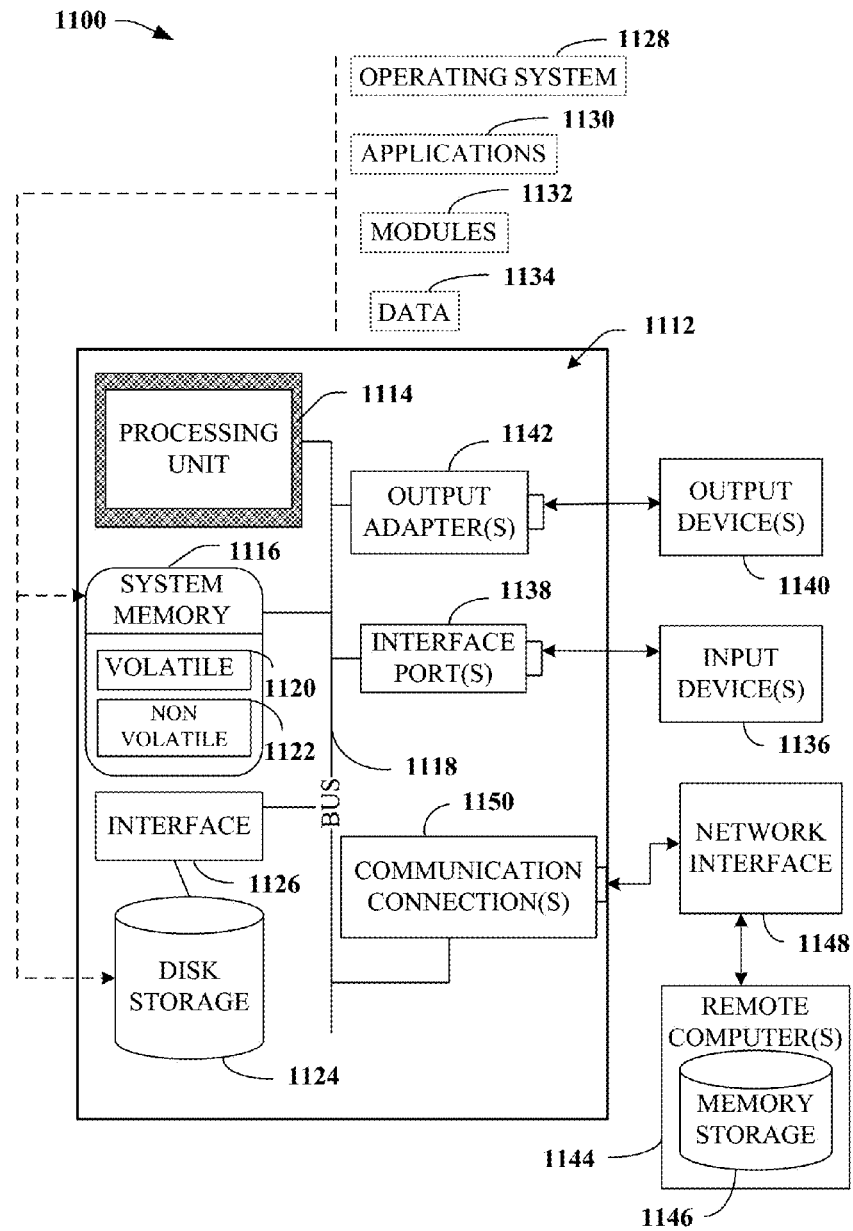
FIG. 11 illustrates a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter, e.g., corresponding to system 810, can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods, e.g., corresponding to system 810, is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, DRAM, SDRAM, DDR SDRAM, ESDRAM, SLDRAM, RDRAM, DRDRAM, and Rambus dynamic RAM.

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A micro-electro-mechanical system (MEMS) gyroscope, comprising:
    a drive oscillation component configured to vibrate a sensor mass at a drive resonance frequency;
    a sense circuit configured to:
        detect a deflection of the sensor mass; and
        generate, based on the deflection and the drive resonance frequency, a demodulated output; and
    a signal processing component configured to:
        receive a set of frequencies comprising a first value representing the drive resonance frequency, a second value corresponding to a sense resonance frequency associated with the sense circuit, and tone values representing tones of the drive resonance frequency, and
        apply, based on the first value the second value, and the tone values, a notch filter to the demodulated output to obtain a filtered output.

2. The MEMS gyroscope of claim 1, wherein the drive resonance frequency corresponds to a resonant frequency of the sensor mass.

3. The MEMS gyroscope of claim 2, wherein the drive oscillation component is further configured to generate mechanical resonance of the sensor mass at the drive resonance frequency.

4. The MEMS gyroscope of claim 1, wherein the sense circuit is further configured to detect a displacement of the sensor mass corresponding to a coriolis force.

5. The MEMS gyroscope of claim 4, wherein the sense circuit is further configured to determine a change in capacitance of a sensor that has been capacitively coupled to the sensor mass.

6. The MEMS gyroscope of claim 5, wherein the sense circuit is further configured to:
    generate, based on the change in capacitance, a deflection output;
    amplify the deflection output using a charge-to-voltage amplifier to obtain an amplified output; and
    demodulate, based on the drive resonance frequency, the amplified output to obtain the demodulated output.

7. The MEMS gyroscope of claim 1, wherein the sense circuit is further configured to:
    convert the demodulated output to a digital value utilizing an analog-to-digital converter.

8. The MEMS gyroscope of claim 7, wherein the signal processing component is further configured to apply the notch filter to the digital value to obtain the filtered output.

9. The MEMS gyroscope of claim 1, wherein the signal processing component is further configured to apply a low pass filter to the filtered output.

10. A method, comprising:
vibrating, by a drive oscillation component of a micro-electro-mechanical system (MEMS) gyroscope, a sensor mass of the MEMS gyroscope at a drive resonance frequency;
detecting, by a sense circuit of the MEMS gyroscope, a deflection of the sensor mass;
generating, by the sense circuit based on the deflection and the drive resonance frequency, a demodulated output; and
in response to receiving, by a signal processing component of the MEMS gyroscope, a set of frequencies from a system, the set of frequencies comprising a first value representing the drive resonance frequency a second value corresponding to a sense resonance frequency associated with the sense circuit, and a group of values representing integer multiples of the drive resonance frequency,
applying, by the signal processing component based on the first value, the second value, and the group of values, a notch filter to the demodulated output to obtain a filtered output.

11. The method of claim 10, wherein the drive resonance frequency corresponds to a resonant frequency of the sensor mass.

12. The method of claim 11, wherein the vibrating of the sensor mass comprises generating, by the drive oscillation component, mechanical resonance of the sensor mass at the drive resonance frequency.

13. The method of claim 10, wherein the detecting of the deflection comprises detecting, by the sense circuit, a displacement of the sensor mass corresponding to a coriolis force.

14. The method of claim 13, wherein the detecting of the displacement comprises determining a change in capacitance of a sensor that is capacitively coupled to the sensor mass.

15. The method of claim 14, wherein the generating of the demodulated output comprises:
amplifying a deflection output representing the change in capacitance using a charge-to-voltage amplifier to obtain an amplified output; and
demodulating, based on the drive resonance frequency, the amplified output to obtain the demodulated output.

16. The method of claim 10, wherein the generating of the demodulated output comprises converting the demodulated output to a digital value utilizing an analog-to-digital converter.

17. The method of claim 16 wherein the applying of the notch filter comprises applying the notch filter to the digital value to obtain the filtered output.

18. The method of claim 10, further comprising:
applying, by the signal processing component, a low pass filter to the filtered output.

19. A system, comprising:
a frequency identification component configured to:
determine a drive resonance frequency corresponding to a vibration of a sensor mass of a MEMS gyroscope; and
determine a sense resonance frequency of a sense circuit of the MEMS gyroscope; and
a programming component configured to:
store the drive resonance frequency a value corresponding to the sense resonance frequency, and tones of the drive resonance frequency in a memory to facilitate an application, by the MEMS gyroscope using the drive resonance frequency, the value corresponding to the sense resonance frequency, and the tones of the drive resonance frequency, of a notch filter to a demodulated output corresponding to a coriolis force associated with a deflection of the sensor mass of the MEMS gyroscope.

20. The system of claim 19, wherein the value represents at least one of the sense resonance frequency or a difference between the sense resonance frequency and the drive resonance frequency.

21. The system of claim 19, wherein the frequency identification component is further configured to:
determine drive resonance frequencies corresponding to sensor masses of respective axes of the MEMS gyroscope, wherein the drive resonance frequencies comprise the drive resonance frequency, and wherein the sensor masses comprise the sensor mass; and
determine sense resonance frequencies of sensors corresponding to the sensor masses, wherein the sense resonance frequencies comprise the sense resonance frequency, and wherein the sense circuit comprises the sensors.

22. The system of claim 21, wherein the programming component is further configured to:
store the drive resonance frequencies and values corresponding to the sense resonance frequencies in the memory to facilitate use, by the MEMS gyroscope, of notch filters according to the drive resonance frequencies and the values corresponding to the sense resonance frequencies, wherein the values comprises the value, and wherein the notch filters comprise the notch filter.

* * * * *